Patented Feb. 21, 1939

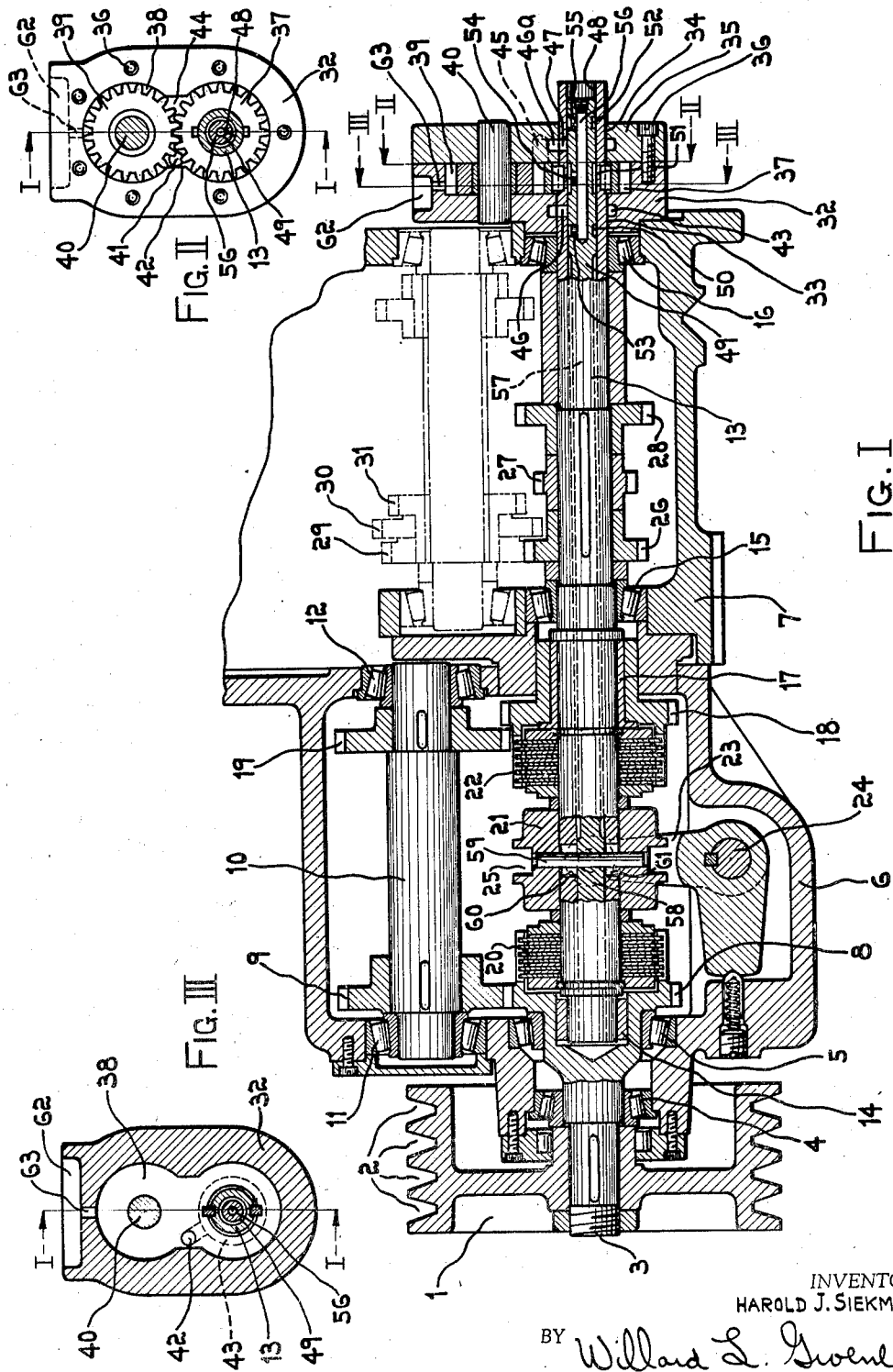

2,148,326

UNITED STATES PATENT OFFICE 2,148,326

COMBINED CLUTCH AND BRAKE DEVICE

Harold J. Siekmann, Cincinnati, Ohio, assignor to The R. K. Le Blond Machine Tool Company, Cincinnati, Ohio, a corporation of Delaware Application October 18, 1937, Serial No. 169,551

14 Claims. (Cl. 192—4)

Heretofore in combined clutch and brake devices friction operated means have been employed to perform the braking function for arresting rotation of a power transmission when the driving clutches are disengaged. The friction braking mechanism has proved most unsatisfactory because of its lack of uniform efficiency of operation due to wear of the frictional engaging parts and the effect of different speeds upon its accurate stopping when employed with change speed transmission such as a geared lathe headstock.

In order to avoid these inherent defects of all frictional brakes I propose the use of a gear pump which is automatically rendered effective as a brake when the driving clutch is disengaged. This I accomplish by closing off the inlet and outlet ports of the gear pump so that its pumping gears will be arrested from rotation and will thus cause the shaft which drives it, which in turn is connected to the power transmission, to be stopped from rotating. It can thus be seen that with this arrangement friction plays no part in the braking of the rotating parts. And furthermore, since the fluid used in such a gear pump brake is substantially non-compressible, the rotating member attached thereto will promptly be brought to a stop with unvarying efficiency when the gear pump brake is rendered effective.

An object of my invention is to provide a combined friction clutch and hydraulic brake mechanism which is interlocked whereby the brake is automatically rendered effective when the clutch is inoperative.

Another object is to provide in a combined clutch and brake device a friction clutch for connecting or disconnecting power to a shaft to be driven and a gear pump brake driven by said shaft and rendered effective when the clutch is disengaged to arrest rotation of said shaft.

Further objects of my invention will appear from the detailed description of the drawing in which:

Figure I is a section on the line I—I of Figures II and III showing the application of my invention to a lathe headstock transmission.

Figure II is a section through the gear pump brake on the line II—II of Figure I.

Figure III is a section through the gear pump brake, with the gears removed, on the line III—III of Figure I.

The device is shown applied to a lathe headstock transmission. Power is derived from a motor which drives the driving pulley 1 through suitable V-belts operating in the grooves 2 of the pulley. The pulley 1 is fixed on the stub shaft 3 which is journaled on anti-friction bearings 4 and 5 carried in the reverse gear housing 6 which in turn is mounted on the headstock 7 of a lathe. On the stub shaft 3 is formed a gear 8 which drives a gear 9 on the shaft 10 which is journaled on the anti-friction bearings 11 and 12 carried in the housing 6. Coaxial with the stub shaft 3 is journaled the drive shaft 13 in the pilot bearing 14 in the inner end of the stub shaft and on the anti-friction bearings 15 and 16 carried in the headstock 7. Journaled on the shaft 13 on its bearing portion 17 is a gear 18 which is driven through an idler gear (not shown) from the gear 19 fixed on the shaft 10. It can thus be seen that when the pulley 1 and stub shaft 3 are rotated, gear 18 will be rotated on the shaft 13 in the opposite direction.

Associated with the stub shaft 3 and its gear 8 is a multiple disc clutch 20, which, when actuated by movement of the operating spool 21 on the shaft 13 will cause the shaft 13 to be directly driven from the shaft 3 and, of course, in the same direction. A similar multiple disc clutch 22 is associated with the gear 18 which, when actuated by the spool 21 will cause the gear 18 to drive the shaft 13 in the opposite direction from that of the shaft 3. These clutches 20 and 22 are alternately rendered effective or both ineffective by axial movement of the spool 21 on the shaft 13. This is accomplished by the usual yoke 23 carried on the rock shaft 24 in the housing 6 which engages in the annular slot 25 in the spool 21, suitable operating leverage being applied to the rock shaft 24 for manipulating it. Suitable gearing 26, 27 and 28 fixed on the drive shaft 13 engages the gearing 29, 30 and 31 to deliver power to the headstock transmission in a usual manner.

In connection with the mechanism just described, I provide means for stopping rotation of the drive shaft 13 when the clutches 20 and 22 are rendered ineffective by moving the spool 21 to neutral position, as shown in Figure I. The arrangement comprises a gear pump brake having a housing 32 fixed on a portion of the headstock 7 adjacent the bearing 16 of the shaft 13. The shaft 13 is journaled in the bore 33 of the housing 32 and in bearing 34 of the cover plate 35 fixed to the housing 32 by screws 36. On the shaft 13 is fixed the gear 37 and is adapted to be rotated by said shaft in a suitable cavity 38 formed in the housing 32, the gear 37 driving the mating pump gear 39 rotatably mounted on the stud 40 carried in the housing 32 and cover plate 35. The chamber 41 formed by the gears 37 and 39, Figures II and III, is connected through the passageway 42 to the annular slot 43 formed in the bore 33 of the housing 32. The chamber 44, Figures I and II, formed by the gears 37 and 39 is connected through the passageway 45 to the annular slot 46a formed in the bore 34 of the cover plate 35. Ports 46 and 47 formed in the shaft 13 connect at all times with the respective annular slots 43 and 46a so that fluid may pass between the gear pump chamber 42 and 44 and the bore 48 formed in the shaft 13.

In the bore 48 of the shaft 13 is a plunger valve 49 having annular grooves 50, 51 and 52 formed around its periphery which are all connected through the respective passageways 53, 54, and 55 to a central passageway 56 formed in the valve 49. The valve 49 has an extension 57 which extends to the left in Fig. I and has an end portion 58 through which passes a pin 59 which also passes through the clutch operating spool 21, the pin 59 operating in slots 60 and 61 elongated axially of the shaft 13 so that when the spool 21 is shifted the plunger valve 49 will be likewise shifted in the bore 48 of the shaft 13. The valve 49 is so designed that when the clutch spool 21, for example, is shifted to the left, Figure I, to render the clutch 20 effective, the gear pump may freely circulate fluid through ports 54 and 55, and when the spool 21 is shifted to the right to render clutch 22 effective the gear pump may freely circulate fluid through ports 53 and 54, under these conditions there being no restriction to the free rotation of the shaft 13. However, when the spool 21 is shifted to neutral position to render both clutches 20 and 22 inoperative as shown in Figure I, the valve 49 is so positioned as to close the ports 46 and 47 so that fluid cannot be expelled from or sucked into the chamber 42 and 44 formed by the gears 37 and 39 of the gear pump, said gears being thus held against rotation and as a result rotation of the shaft 13 will be arrested. The gear pump brake may be at all times kept primed with fluid from the lubricating system for the headstock transmission which is deposited in the reservoir 62 which is connected to the cavity 38 in the housing 32 by the passageway 63.

Having fully set forth and described my invention what I claim is:—

1. In a combined clutch and brake device, a friction clutch for connecting or disconnecting power to a member to be driven, a hydraulic dynamic brake connected to said member, and means inter-connecting said clutch and said brake whereby one or the other may be alternately rendered effective.

2. In a combined clutch and brake device, a friction clutch for connecting or disconnecting power to a shaft to be driven, a gear pump connected to and driven by said shaft, and means to prevent rotation of said gear pump when said clutch is rendered inoperative.

3. In a combined clutch and brake device, a friction clutch for connecting or disconnecting power to a shaft to be driven, a gear pump connected to and driven by said shaft, means to permit said gear pump to freely circulate fluid between its inlet and exhaust ports when said clutch has power connected to said shaft, and means for preventing said fluid circulation by said gear pump when said clutch is inoperative.

4. In a combined clutch and brake device, a friction clutch for connecting or disconnecting power to a shaft to be driven, means for actuating said clutch, a gear pump connected to and driven by said shaft, means to permit said gear pump to freely circulate fluid between its inlet and exhaust ports, and means operated by the means for actuating said clutch to prevent said fluid circulating by said gear pump when said clutch is inoperative.

5. In a combined clutch and brake device, a friction clutch for connecting or disconnecting power to a shaft to be driven, a gear pump connected to and driven by said shaft, a valve connected to the inlet and exhaust ports of said pump, said valve being adapted to connect said ports to permit said pump to freely circulate fluid between them or to close off said ports to prevent rotation of said pump, and means to actuate said valve to close off said ports when said clutch is rendered inoperative.

6. In a combined clutch and brake device, a friction clutch for connecting or disconnecting power to a shaft to be driven, a gear pump connected to and driven by said shaft, a valve connected to the inlet and exhaust ports of said pump, said valve being adapted to connect said ports to permit said pump to freely circulate fluid between them or to close off said ports to prevent rotation of said pump, means connected to said pump to keep it properly primed with fluid, and means to actuate said valve to close off said ports when said clutch is rendered inoperative.

7. In a machine tool transmission, a driving member, a driven member, reversing gearing associated with said members, clutches for connecting said driving member to said driven member for alternately rotating it in one direction or the other, a gear pump driven by said driven member, a valve connected to the inlet and exhaust ports of said pump, said valve being adapted to connect said ports to permit said pump to freely circulate fluid between them or to close off said ports to prevent rotation of said pump, and common means for alternately rendering said clutches and said gear pump effective for driving or arresting movement of said driven member.

8. In a machine tool transmission, a driving shaft, a driven shaft, a pair of clutches associated with said driven shaft, reversing gearing connecting said driving shaft to said clutches whereby one of said clutches causes said driven shaft to rotate in the same direction as said driving shaft when rendered operative and said other clutch causes said driven shaft to rotate in the opposite direction from said driving shaft when it is rendered effective control means for rendering one or the other or both of said clutches inoperative, a gear pump driven by said driven shaft, control means for the inlet and exhaust ports of said gear pump whereby said pump may freely circulate fluid between said ports or said ports may be closed off to prevent rotation of said driven shaft, and inter-connecting means between said control means for said clutches and said control means for said gear pump whereby said gear pump is rendered effective to stop rotation of said driven shaft when both of said clutches are rendered inoperative.

9. In a machine tool transmission, a driving shaft, a driven shaft, a clutch for engaging and disengaging said shafts, a gear pump brake connected to said driven shaft for arresting rotation of said driven shaft when said driving shaft is disengaged therefrom, means connecting said driven shaft to said transmission, and means for supplying fluid to said gear pump brake from the lubricating system for said transmission.

10. In a combined clutch and brake device, a clutch for connecting or disconnecting a source of power to or from a shaft to be rotated, a gear pump driven by said shaft, an axial bore in said shaft, passageways connecting inlet and exhaust ports of said pump to said bore and a plunger valve in said bore for inter-connecting or closing off said passageways.

11. In a combined clutch and brake device, a clutch for connecting or disconnecting a source of power to or from a shaft to be rotated, a gear pump having one of its gears mounted on said shaft whereby said shaft drives said gear pump, an axial bore in said shaft, passageways connecting inlet and exhaust ports of said pump to said bore, and a plunger valve in said bore for inter-connecting or closing off said passageways.

12. In a power transmission, a driving member, means for rendering said driving means operative or inoperative, a hydraulic dynamic brake connected to said member, and means for rendering said brake effective when said driving member is rendered inoperative for arresting the driving action of said member.

13. In a power transmission, a prime mover, means for rendering said prime mover operative or inoperative, a hydraulic gear pump brake connected to said prime mover, and means for rendering said brake effective when said prime mover is rendered inoperative for arresting the movement of said prime mover.

14. In a power transmission, a reversible source of power, means for reversing and for rendering said source of power inoperative, a hydraulic dynamic brake connected to said source of power, and means for rendering said brake effective when said source of power is rendered inoperative.

HAROLD J. SIEKMANN.